UNITED STATES PATENT OFFICE.

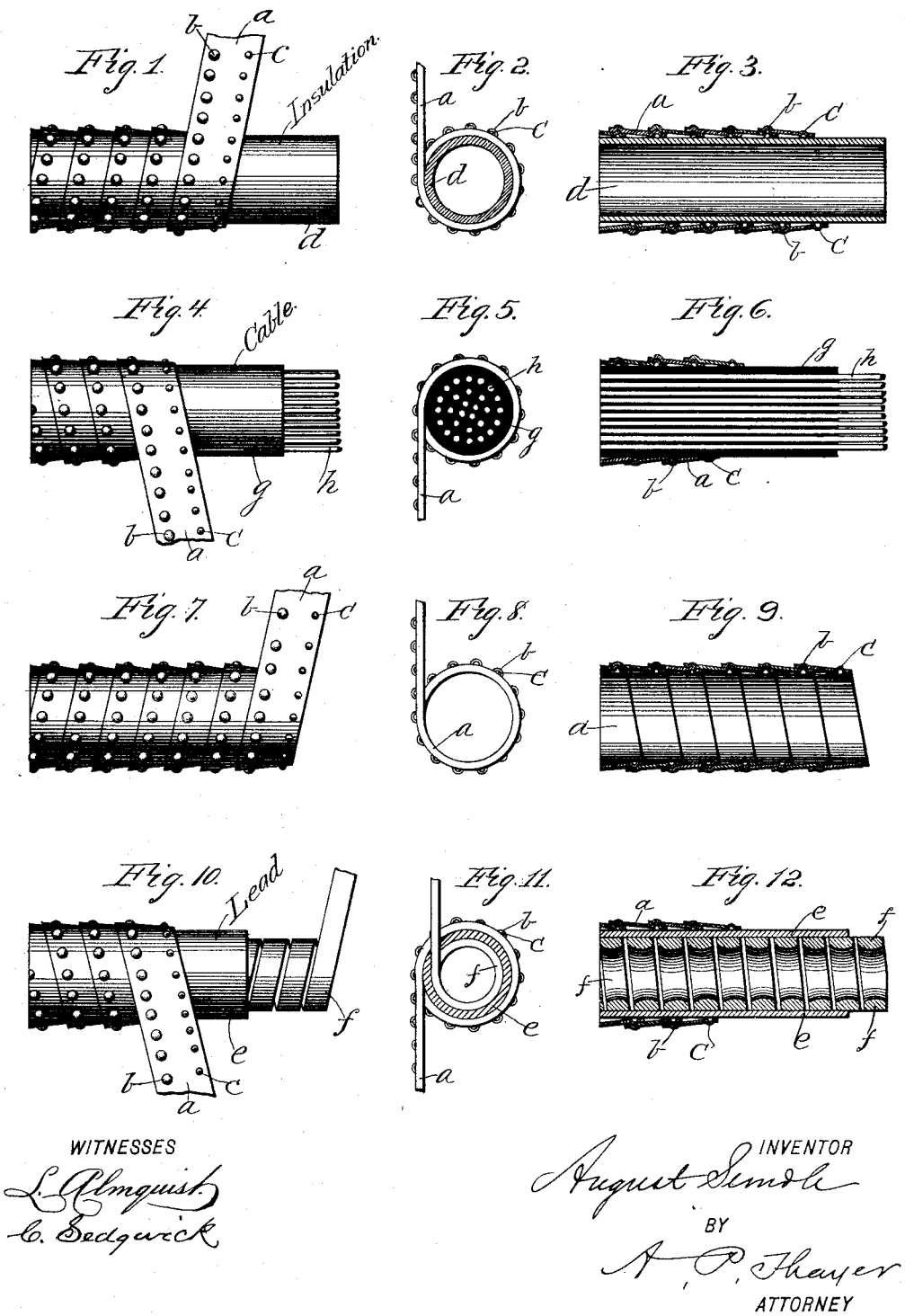

AUGUST SUNDH, OF YONKERS, NEW YORK.

PROTECTIVE CASING FOR ELECTRIC CABLES OR WIRES.

SPECIFICATION forming part of Letters Patent No. 630,636, dated August 8, 1899.

Application filed March 28, 1899. Serial No. 710,768. (No model.)

*To all whom it may concern:*

Be it known that I, AUGUST SUNDH, a citizen of the United States of America, and a resident of Yonkers, county of Westchester, and State of New York, have invented certain new and useful Improvements in Protective Casings for Electric Cables or Wires, of which the following is a specification.

My invention relates to the exterior metallic protective portion of the cable; and it consists of the said part of the cable constructed of coiled metal strips in the manner hereinafter described, so as to be flexible and at the same time capable of tensile strength to resist being pulled apart in handling, placing, and in other ways in which it may be subject to such stresses, also so as to be nail-proof to protect the cable from nails when placed in the walls of buildings, as follows, reference being made to the accompanying drawings, in which—

Figure 1 is a side view of a short section of the protective portion of a cable made in accordance with my invention. Fig. 2 is an end view, and Fig. 3 is a longitudinal section, of the structure of Fig. 1. Fig. 4 is a side view, Fig. 5 an end view, and Fig. 6 a longitudinal section, of the structure of Fig. 1 with a section of the cable inserted. Fig. 7 is a side view, Fig. 8 an end view, and Fig. 9 a longitudinal section, of the structure of Fig. 1 without the lining of insulating material represented in Fig. 1; and Fig. 10 is a side view, Fig. 11 an end view, and Fig. 12 a longitudinal section, of the structure of Fig. 1 with a lining of lead and with an inner flat-strip coil.

The essential feature of the invention consists of one or more flat metallic strips, as $a$, having a row of projecting spurs or bosses, as $c$, on one side and along one margin and a row of recesses or indentations $b$ along the other margin and on the other side wound spirally and overlapped so that the indentations cover the spurs and thus interlock the respective coils, whereby an insulating tubular protective case is provided that is flexible to permit the inclosed cable to bend freely in handling and placing and in turning angles and sinuous courses when used in buildings, and the coils will not be pulled apart nor materially disturbed by the tensile stresses to which the cable is subject. The spurs are produced by indenting the strip in the same manner as it is indented to form the recesses; but they may be produced in any other approved way, and it is to be understood that the spurs resulting from the indentations made to produce the recesses have no function as spurs, and they only appear in the drawings as resultant of the preferred mode of producing the recesses.

The spurs will be sufficiently smaller than the recesses to allow them such lateral play in the recesses as may be desirable for the requisite flexibility of the cable.

In the drawings I have represented only one strip, coiled so as to overlap itself; but it is manifest that two or more may be coiled together, the strips being started with the recessed margin of one strip overlapping the spur margin of another.

I propose to construct the case independently of the cable when it may be desired to inclose the cable in such manner that the cable may be drawn in and out in order that the cable may be removed for inspection and repairs without removing the casing from its fixed position. In Figs. 7, 8, and 9 such construction is represented, the casing consisting only of the metallic strip. Figs. 1, 2, and 3 show the same construction, with an insulating-lining $d$, of asbestos or other suitable material, inserted, and in Figs. 10, 11, and 12 I have represented a lining of lead $e$, together with an inner coiled-strip lining $f$, a construction better adapted for laying in water and where greater strength of the case is required.

Figs. 4, 5, and 6 represent the casing constructed on the cable $g\ h$, as when the cable is not required to be removable from the casing.

It will be seen that the overlapped coils of metallic strips make an effective nail-proof casing for protection of the cable when laid in the walls of buildings, where it is exposed to the liability of nails being driven in.

Instead of the spurs being outside and the recesses inside of the strip, as represented, they may be respectively reversed, the operation and effect being the same.

What I claim as my invention is—

1. An electric metallic casing for electric cables, consisting of a spirally-wound overlapped metallic strip having spurs along one margin and recesses along the other margin, said recesses overlapping said spurs.

2. An elastic metallic casing for electric cables, consisting of a spirally-wound overlapped metallic strip having spurs along one margin and recesses along the other margin, said recesses overlapping said spurs, a lining for said casing and an electric cable inclosed in said lining.

3. An electric metallic casing for electric cables consisting of a spirally-wound overlapped metallic strip having spurs along one margin and recesses along the other margin, said recesses overlapping said spurs, a lining for said casing and a flat-strip coil inside of said lining, said casing adapted for the cable to be drawn in and out.

4. An electric metallic casing for electric cables, consisting of a spirally-wound overlapped metallic strip having spurs along one margin and recesses along the other margin, said recesses overlapping the spurs, a lead lining for said casing and a spirally-coiled flat strip inclosed in said lining.

Signed by me at New York this 25th day of March, 1899.

AUGUST SUNDH.

Witnesses:
C. SEDGWICK,
J. HOWARD.